United States Patent
Zajcev et al.

(10) Patent No.: US 7,727,375 B2
(45) Date of Patent: Jun. 1, 2010

(54) METHOD AND AN ARRANGEMENT TO DETERMINE A RUNNING VALUE OF THE GAP DURING THE ELECTROCHEMICAL MACHINING

(75) Inventors: Alexandr Nikolaevich Zajcev, Lesotechnikum (RU); Igor Leonidovich Agafonov, Prospekt Oktyabrja (RU); Rafail Ramzisovich Muchutdinov, Sverdlova (RU); Nasich Zijatdinovich Gimaev, Letija Sssr (RU); Viktor Nikolaevich Kucenko, Letiya (RU); Aleksandr Leonidovich Belogorsky, Lesothechnikuma (RU)

(73) Assignee: Koninklijke Philips Electronics N.V., Eindhoven (NL)

( * ) Notice: Subject to any disclaimer, the term of this patent is extended or adjusted under 35 U.S.C. 154(b) by 1590 days.

(21) Appl. No.: 10/515,083

(22) PCT Filed: Apr. 25, 2003

(86) PCT No.: PCT/IB03/01846

§ 371 (c)(1),
(2), (4) Date: Nov. 18, 2004

(87) PCT Pub. No.: WO03/099499

PCT Pub. Date: Dec. 4, 2003

(65) Prior Publication Data

US 2005/0178671 A1    Aug. 18, 2005

(30) Foreign Application Priority Data

May 23, 2002    (WO) .................... PCT/IB02/02809

(51) Int. Cl.
B23H 7/18    (2006.01)

(52) U.S. Cl. .............. 205/643; 205/642; 204/224 M
(58) Field of Classification Search ............ 204/224 M; 205/642, 643
See application file for complete search history.

(56) References Cited

U.S. PATENT DOCUMENTS

| | | | |
|---|---|---|---|
| 4,213,834 A | 7/1980 | Semashko et al. | |
| 5,833,835 A | 11/1998 | Gimaev et al. | |
| 6,214,200 B1 | 4/2001 | Altena et al. | |
| 6,723,223 B2 * | 4/2004 | Zaitsev et al. ............... | 205/644 |
| 2002/0169516 A1 * | 11/2002 | Brussee et al. ............ | 700/162 |
| 2003/0010650 A1 * | 1/2003 | Zaitsev et al. ............... | 205/645 |

OTHER PUBLICATIONS

Asaoka Teruo et al, "Machining Gap Control Device for Electro-Chemical Machine", JP63306825, Japanese Abstracts of Japan, Dec. 14, 1988.

* cited by examiner

*Primary Examiner*—Harry D. Wilkins, III
*Assistant Examiner*—Nicholas A. Smith

(57) ABSTRACT

A method and an arrangement (1) for determining an actual value of the gap (4) between the work piece (2) and the electrode (3) during a process of electrochemical machining. According to the invention first process control means (30) are arranged to supply a set of machining current pulses (Im) to the electrode and the work piece. Second process control means (32) are arranged to perform a measurement of an operational parameter (U) representing a value of the gap (4) in real time under operational conditions. The second process control means (32) comprise means to determine the actual value of the gap (55a) based on the measurement of the operational parameter and logical unit (55b) to actuate the positioning means (8) to translate the electrode (3) in case the measured value of the gap deviates from the preset value of the gap.

13 Claims, 3 Drawing Sheets

METHOD AND AN ARRANGEMENT TO DETERMINE A RUNNING VALUE OF THE GAP DURING THE ELECTROCHEMICAL MACHINING

This application is a national stage application of International application Ser. No. PCT/IB03/01846, filed Apr. 25, 2003.

The invention relates to a method for determining an actual gap dimension between an electrode and a work piece during a process of electrochemical machining of the work piece.

The invention further relates to an arrangement for electrochemical machining of an electrically conductive work piece by applying electrical machining pulses between the work piece and an electrically conductive electrode while electrolyte is supplied between the work piece and the electrode.

A method to determine a value for the gap for an electrochemical machining is known from U.S. Pat. No. 6,214,200. According to the known method first the work piece is machined by a number of machining pulses. As a result of the machining a front surface of the work piece is dissolved in the electrolyte, causing an increase of an actual value of the gap between the work piece and the electrode. In order to compensate for said increase the electrode has to be repositioned with respect to the work piece so as to maintain a preset gap value. To perform the measurement of the actual value of the gap, according to the known method, the process of the electrochemical machining has to be stopped followed by an initiation of said measurement. For the purpose of the measurement first the electrode is brought into a mechanical contact with the workpiece. The electrode is translated by means of suitably arranged positioning means. Afterwards, the electrode is translated until both the mechanical and the electrical contacts with the work piece are broken. A corresponding position of the electrode is taken as a zero value of the gap. The electrode is then translated by the preset value of the gap and the electrochemical machining is resumed.

It is a disadvantage of the known method that in order to perform the measurement of the actual value of the gap the electrode has to be manipulated. This can only be performed when the electrochemical process is terminated, leading to a decreased efficiency of the process of electrochemical machining.

It is an object of the invention to provide a method for determining an actual gap dimension between an electrode and a work piece without an interference with the process of electrochemical machining.

In order to solve the problem of the prior art, the method according to the invention is characterized in that said method comprises the steps of performing a measurement of a value of an operational parameter characterizing the electrochemical process; deducing the actual gap dimension from said value based on an a-priori established relationship between said value and the actual gap dimension.

According to the technical measure of the invention a monitoring of the actual value of the gap can be performed in real time without causing interference with the electrochemical process, therefore leading to no reduction of the efficiency of the process as a whole.

An embodiment of the method according to the invention is characterized in that a voltage pulse across the gap is selected as the operational parameter. This technical measure is based on an insight that the voltage pulse accumulated across the gap as a result of an application of a machining pulse is directly related to the absolute dimension of the value of the gap between the work piece and the electrode. The details elaborating this insight will be discussed with reference to FIG. 1.

A further embodiment of the method according to the invention is characterized in that an envelope based on the global minim of successive voltage pulses is constructed and is used to monitor the actual value of the gap. This technical measure is based on an insight that the envelope constructed on the global minim of the voltage pulses is directly proportional to the absolute value of the gap. Therefore, by measuring the voltage pulses and by constructing the envelope it is possible to monitor the absolute value of the gap in real time and, therefore, to track an increase of the actual value of the gap with time. The monitoring can be used to set a trend of the development of the gap which can be further used for process control purposes.

A further embodiment of the method according to the invention is characterized in that a further operational parameter is used for validation of the measurement of the value of the operational parameter. This technical measure is based on an understanding that the method according to the invention is particularly suited for electrochemical processes under stable conditions. A process stability is characterized by a stable temperature of the electrolyte, minimal gaseous phase in the electrolyte and minimal oxide layers or depositions of the surface of the electrode, etc. It has been found that by performing a Fourier analysis of the pulse shape of the voltage pulse accumulated across the gap after an application of a pulse of the machining polarity, it is possible to monitor the process stability in real time. In particular, it is found that the stable electrochemical process is characterized by substantially zero coefficients of the Fourier transformation of the voltage pulse. Therefore, by monitoring the Fourier coefficients in real-time it is possible to monitor the stability of the process and, thus, to validate the measurements of the voltage pulses to be used for determining the actual gap dimension. This technical measure further improves the reliability of the method according to the invention.

These and other aspects of the invention are discussed with reference to Figs.

Figure 1:
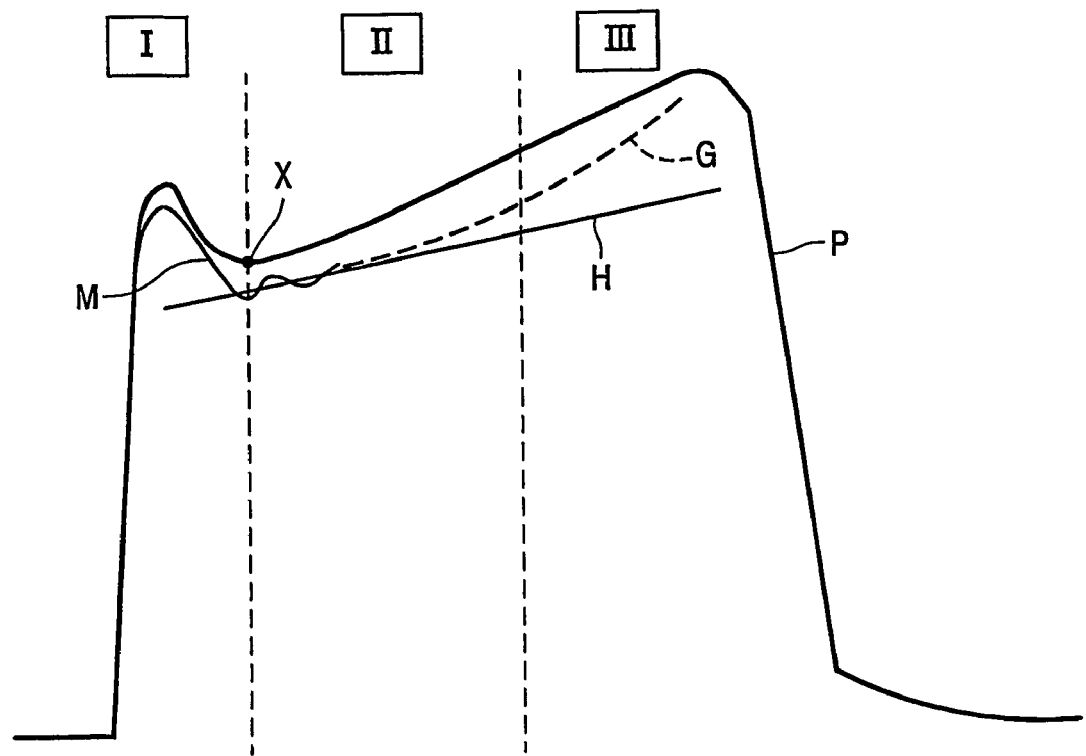
FIG. 1 shows schematically a pulse shape for a voltage pulse accumulated across the gap after an application of a machining pulse.

FIG. 1 shows schematically a pulse shape for a voltage pulse accumulated across the gap after an application of a machining pulse. It has been found that processes taking place in the gap during the machining of the work piece can be divided into three successive periods, schematically shown by I, II, III. The first period I is characterized by a stable condition of the electrolyte in the gap. The second period II is characterized by heating of the electrolyte and an initiation of gas filling of the electrolyte in the gap. The third period III is characterized by a substantial increase of both the electrolyte temperature and the gaseous phase. By analyzing the pulse shape of the voltage pulse it is possible to distinguish between different components contributing to the resulting pulse shape of the voltage pulse P accumulated across the gap. These components are qualitatively presented in FIG. 1 by curves denoted with M, G, H, respectively. It is understood that the pulse shape in the first region I characterizes a transition to stable machining conditions M established at a point of the global minimum X, whereas the pulse shape in the second and third regions II, III, respectively represents unstable conditions in the gap, accompanied by electrolyte heating H and gas filling of the electrolyte G. In the regions II and III the electrical resistance of the gap is substantially increased resulting in an inconsistency in the relation between the voltage pulse accumulated across the gap and the absolute value of the gap. It is understood that the value of the voltage pulse within the first region directly correlates with the absolute value of the gap. It is advantageous to use the characteristic point X, being a global minimum of the voltage pulse as a calibration point for purposes of the determination of the absolute value of the gap. Thus, in order to perform a monitoring of the actual value of the gap under operational conditions, first a calibration between the voltage at point X and the gap has to be performed. This calibration can easily be carried out by a person skilled in the art, said calibration comprising a measurement of a range of global minim of the voltage pulse for a range of gap dimensions. To determine a position of the global minimum X in the voltage pulse P and a corresponding value of the voltage a standard available soft-ware can be used.

Figure 2:
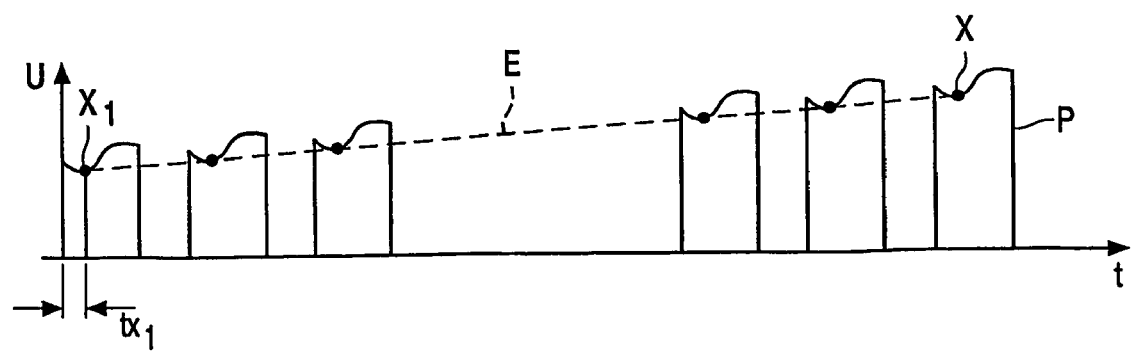
FIG. 2 shows schematically an example of an envelope constructed for measured voltage pulses.

FIG. 2 shows schematically an example of the envelope constructed for the measured voltage pulses. Due to the fact that it is possible to find a position of the global minimum X of the voltage pulses P with a high degree of reproducibility using existing software, it has been found to be advantageous to construct the envelope E based on the global minim. As is schematically shown in FIG. 2, the envelope is an increasing function with time t, having values which directly correspond to the values of the gap between the electrode and the work piece. Therefore, by monitoring the value of the envelope and by addressing the predetermined calibration, discussed with reference to FIG. 1, the actual value of the gap under operational conditions can be determined and monitored for purposes of process control. By monitoring the slope of the envelope it is possible to control the measurement of the voltage pulse accumulated across the gap. Such a measurement control can be arranged by setting a frequency of the voltage pulse measurement depending upon the slope of the envelope. For lower slope value the frequency of the voltage pulse measurement can be reduced.

Figure 3:
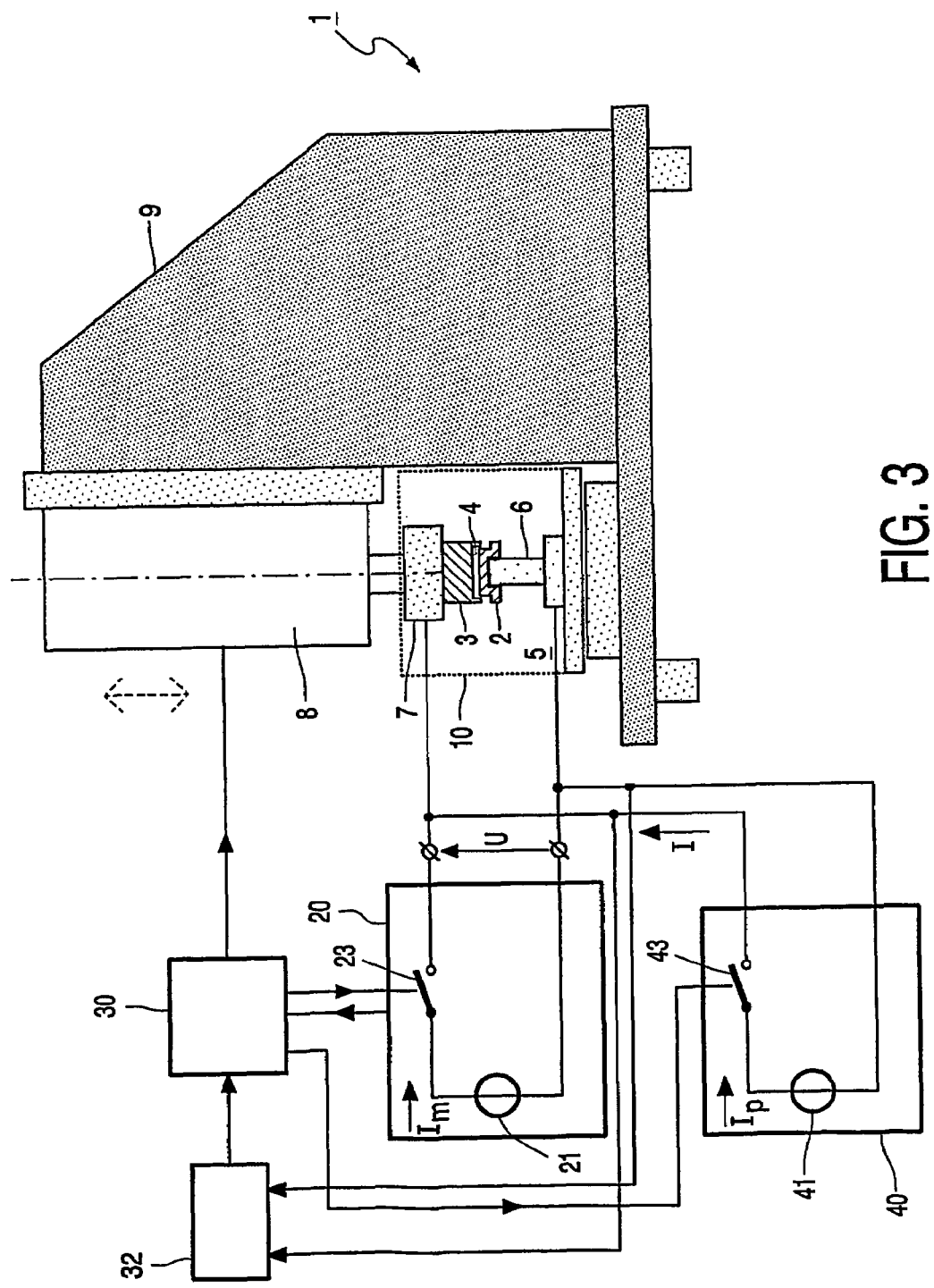
FIG. 3 shows schematically an embodiment of arrangement for electrochemical machining of a work piece according to the invention.

FIG. 3 shows schematically an embodiment of arrangement 1 for electrochemical machining of a work piece 2 according to the invention. The apparatus 1 comprises a base 6 for positioning a work piece 2, a holder 7 for positioning an electrode 3, and an actuator 8 for moving the holder 7 and the base 6 with respect to one another. The base 6 and the actuator 8 are mounted on a chassis (not shown) having a rigid construction so as to enable a working distance between the electrode 3 and the work piece 2 to be set with a high accuracy. The arrangement comprises further a reservoir 10 filled with an electrolyte 5 in such a manner that the gap 4 formed as a result of the working distance between the electrode 3 and the work piece 2 is filled with the electrolyte 5. In the present case the electrolyte comprises $NaNO_3$ dissolved in water. As an alternative it is possible to use another electrolyte, such as for example NaCl or a combination of $NaNO_3$ and an acid. The electrolyte 5 is pumped through the gap 4 by means of an installation, not shown in the fig. By means of the apparatus 1 the work piece 2 can be machined by passing a machining current pulses from a power supply unit 20 through the electrolyte 5 in the gap 4 via the electrode 3 and the work piece 2. The power supply unit 20 comprises a current pulse generator 21 and a controllable switch 23. When the polarity of the applied current pulse corresponds to the machining polarity Im, the material of the work piece 2 is removed from its surface and is dissolved in the electrolyte 5 and a voltage pulse U, as discussed with reference top FIG. 1 is accumulated across the gap. The apparatus 1 further comprises a second power supply unit 40, where a source of the current pulses 41 of the opposite polarity Ip is incorporated. The second power supply source comprises further a controllable switch 43 to be operated by a first control unit 30. In case it is decided that the machining pulses Im are to be alternated with the pulses of the opposite polarity Ip, the first control unit 30 alternatively operates the controllable switches 23 and 43 to supply a current pulse of a suitable polarity to the gap 4. It is also possible to use a power supply, where the first and the second power supply sources are integrated and constitute a single power supply source, which is programmable by the first process control unit 30 to deliver alternating current pulses of opposite polarity Im, Ip. The apparatus 1 according to the invention comprises further a second control unit 32 arranged to automatically determine the actual value of the gap under operational conditions. The second control unit 32 is arranged to communicate to the first control unit 30, preferably by means of a RS232 interface. Also, the second control unit 32 is arranged to perform a measurement and a monitoring of the value of the voltage pulse U accumulated across the gap. The second control unit 32 is discussed in more detail with reference to FIG. 4.

Figure 4:
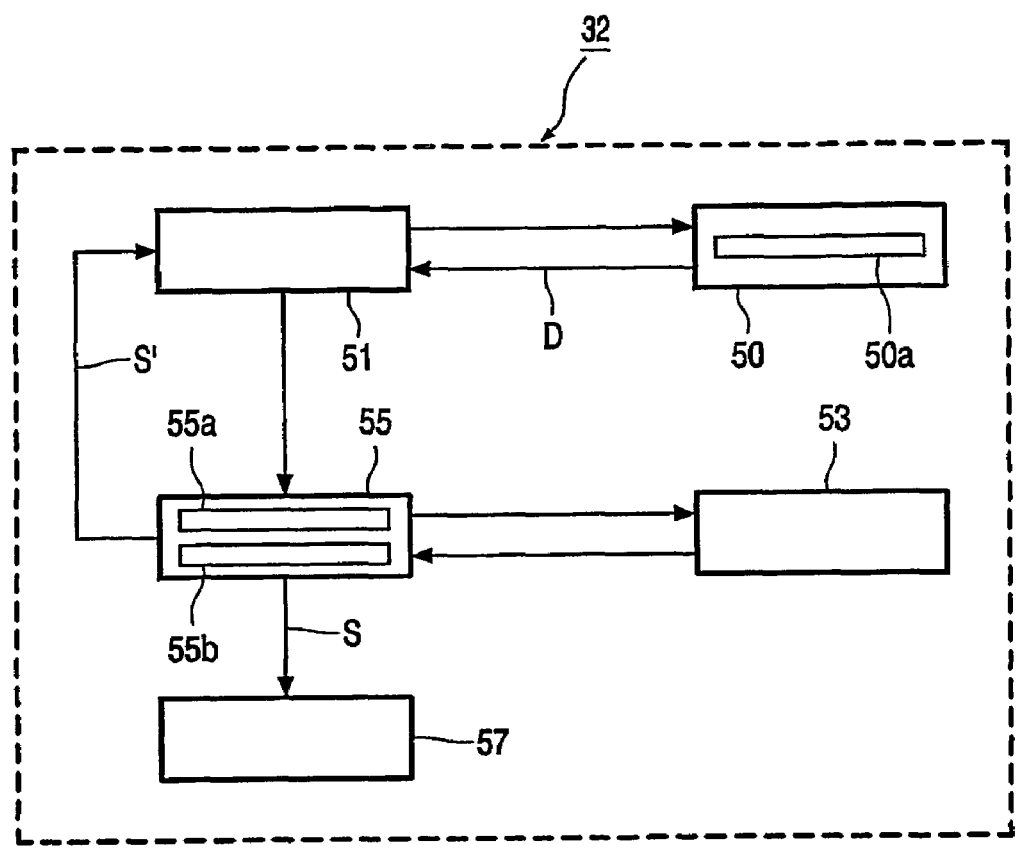
FIG. 4 shows schematically an embodiment of process control means.

FIG. 4 presents in a schematic way an embodiment of the second control unit 32 according to the invention. The second control unit 32 comprises probing means 51 arranged to perform a measurement of a value of the voltage pulse accumulated across the gap, for example by means of a digital oscilloscope (not shown). The probing means 51 can also be arranged to digitize a relevant part of the voltage pulse and to input it for further analysis to an optional further control means 50. It is particularly advantageous to arrange the further control means 50 to comprise a validation unit 50a arranged to perform a Fourier transformation of the digitized voltage pulse and to deduce the Fourier coefficients of said transformation. For the stable electrochemical conditions in the gap, the Fourier coefficients are substantially zero. The validation unit 50a can be arranged to actuate a disabling signal D to the probing means 51 to discard a measurement in case the Fourier coefficients are substantially non-zero. In practice, small deviations from the absolute zero value for the Fourier coefficients for stable conditions occur. These deviations are caused first by electromagnetic interferences with the background and, secondly by the quality of the measurement equipment. Preferably, the further control means 50 are arranged to actuate the disabling signal D in case the Fourier coefficients exceed a preset threshold value. The threshold value the Fourier coefficients for actuation of the disabling signal D can be obtained experimentally by deducing the Fourier coefficients for stable conditions in a set-up where the electromagnetic cell is substituted by an equivalent load. In case the disabling signal is not actuated, the measured data are forwarded to the means for generating a control signal 55. The second control unit 32 comprises further calibration means 53 arranged to store a numerical calibration of an actual value of the gap and a corresponding value of the global minimum of the voltage pulse. The calibration can be stored as a look-up table (not shown) or as a mathematical function representing the dependence between global minim values and the corresponding gap dimensions. The calibration can be obtained on basis of experiments carried out preceding to the electrochemical machining. This calibration is addressed by the means 55 upon receipt of the data from the probing means 51. It is sufficient to arrange means for generating a control signal 55 to compute the value of the gap based on a single measurement of the voltage pulse U accumulated across the gap. In that case means 55 comprise computation means 55a arranged to derive a value of the global minimum of the voltage pulse. The actual value of the gap is determined from the derived value of the global minimum and a calibration table stored in the calibration means 53. In case the calculated value of the gap deviates from a preset value, a control signal S is produced. This condition can be checked by a suitably arranged logical unit 55b. The control signal S is then forwarded to the process control means 57 arranged to drive the means for translating the electrode (not shown). When the preset value of the gap is restored, the process of the electrochemical machining is carried on until a next control signal S is actuated. Additionally, means 55a can be arranged to construct an envelope based on a number of measured successive voltage pulses. Next to this, means for generating the control signal 55 can be arranged to comprise further a logical unit 55b to determine the actual value of the gap based on the envelope and the calibration data stored in the calibration means 53. The logical unit 55b can also be arranged to calculate the slope of the envelope and to produce a second control signal S' to the probing means 51 to reduce a frequency of the voltage pulse measurements in case the slope in unsubstantial. Preferably, the logical unit 55b comprises a look-up table (not shown), where threshold values for the slope corresponding to reduced, standard and high frequency of measurements of the voltage pulses are stored. In this way the electrochemical arrangement according to the invention is self-controlling, whereas the actual value of the gap is accurately measured in real-time under the operational conditions without causing a decrease in process efficiency.

The invention claimed is:

1. A method for determining an actual gap dimension between an electrode and a work piece during a process of electrochemical machining of the work piece, the method comprising acts of:
    performing a measurement of a pulse shape of a voltage pulse accumulated across a gap between the electrode and the work piece, the pulse shape characterizing the electrochemical process, wherein the pulse shape represents a transition from a stable operational state to an unstable operational state within the gap;
    determining the actual gap dimension from said pulse shape based on an a-priori established relationship between said pulse shape and the actual gap dimension; and
    maintaining a substantially constant gap between the electrode and the work piece using the determined actual gap dimension.

2. The method according to claim 1, comprising acts of constructing an envelope based on a global minimum of successive voltage pulses and using the constructed envelope to monitor the actual value of the gap.

3. The method according to claim 1, comprising act of calculating a further operational parameter and validating the measurement of the pulse shape using the calculated further operational parameter.

4. The method according to claim 3, comprising an act of calculating Fourier coefficients of the voltage pulse as the further operational parameter.

5. An arrangement for electrochemical machining of an electrically conductive work piece by applying electrical machining pulses between the work piece and an electrically conductive electrode while electrolyte is supplied between the work piece and the electrode, said arrangement comprising means for positioning the electrode and the work piece in a spatial relationship so as to maintain a substantially constant gap between the electrode and the work piece using the determined actual gap; means for performing a measurement of a pulse shape of a voltage pulse accumulated across a gap between the electrode and the work piece, the pulse shape, wherein the pulse shape represents a transition from a stable operational state to an unstable operational state within the gap; means for generating a control signal based on said measurement; and process control means to drive the means for positioning the electrode and the work piece in a spatial relationship based on the control signal so as to maintain an assigned preset value of the gap.

6. The arrangement according to claim 5, wherein said means for generating the control signal comprises:
    computation means arranged to construct an envelope based on a number of successive voltage pulses; and
    logical unit arranged to determine the actual gap dimension based on said envelope and to produce a control signal in case the determined gap dimension deviates from the preset value.

7. The arrangement according to claim 5 comprising further control means arranged to validate the measurement of the pulse shape.

8. The method according to claim 1, comprising acts of constructing an envelope based on a global minimum of successive voltage pulses and setting a frequency of the voltage pulse measurement depending upon a slope of the envelope.

9. The method according to claim 4, comprising an act of actuating a disabling signal if the Fourier coefficients exceed a preset threshold value.

10. The method according to claim 9, comprising an act of applying the disabling signal to disable the voltage pulse.

11. The arrangement according to claim 5, wherein said means for generating the control signal comprises:
    computation means arranged to construct an envelope based on a number of successive voltage pulses; and
    logical unit arranged to set a frequency of the voltage pulse measurement depending upon a slope of the envelope.

12. The arrangement according to claim 5, comprising means for calculating Fourier coefficients of the voltage pulse and means for actuating a disabling signal if the Fourier coefficients exceed a preset threshold value.

13. The arrangement according to claim 12, comprising means for applying the disabling signal to disable the voltage pulse.

* * * * *